US009072925B2

United States Patent
Bermes et al.

(10) Patent No.: US 9,072,925 B2
(45) Date of Patent: Jul. 7, 2015

(54) VALVE

(75) Inventors: Karl Bermes, Irrel (DE); Frank Felten, Zemmer (DE)

(73) Assignee: FIWAREC VALVES & REGULATORS GMBH & CO. KG, Föhren (DE)

( * ) Notice: Subject to any disclaimer, the term of this patent is extended or adjusted under 35 U.S.C. 154(b) by 417 days.

(21) Appl. No.: 13/697,105

(22) PCT Filed: May 6, 2011

(86) PCT No.: PCT/EP2011/057259
§ 371 (c)(1),
(2), (4) Date: Nov. 9, 2012

(87) PCT Pub. No.: WO2011/141356
PCT Pub. Date: Nov. 17, 2011

(65) Prior Publication Data
US 2013/0062079 A1 Mar. 14, 2013

(30) Foreign Application Priority Data
May 11, 2010 (DE) .......................... 10 2010 028 858

(51) Int. Cl.
A62C 37/36 (2006.01)
A62C 35/68 (2006.01)
(Continued)

(52) U.S. Cl.
CPC ............... *A62C 35/68* (2013.01); *A62C 35/645* (2013.01); *F16K 1/305* (2013.01); *F16K 17/38* (2013.01); *F16K 31/383* (2013.01); *G05D 16/106* (2013.01)

(58) Field of Classification Search
CPC ........ A62C 35/58; A62C 35/62; A62C 35/64; A62C 35/645; A62C 35/68; F16K 1/305; F16K 17/38; F16K 31/383; G05D 16/106
See application file for complete search history.

(56) References Cited

U.S. PATENT DOCUMENTS

| 6,286,544 B1 | 9/2001 | Miyazoe et al. |
| 6,708,772 B2 | 3/2004 | Bermes |

(Continued)

FOREIGN PATENT DOCUMENTS

| AU | 1997 21550 B2 | 9/1999 |
| CN | 1266183 A | 9/2000 |

(Continued)

*Primary Examiner* — Christopher Kim
(74) *Attorney, Agent, or Firm* — McGlew and Tuttle, P.C.

(57) ABSTRACT

A valve for a pressure vessel of an automatic fire extinguishing system comprises a valve housing with a valve output opening for connecting an extinguishing line, a valve input opening for connecting the valve to the pressure vessel, a valve seat arranged between the valve output opening and the valve input opening, a low pressure chamber for connecting a triggering device and a high pressure chamber connectable with the low pressure chamber, wherein arranged in a the valve housing is a closing piston comprising a valve seat seal, which can be moved between a closing piston closed position and a closing piston open position, a pressure control unit in pressure connection with the valve input opening and the low pressure chamber for controlling the low pressure in the low pressure chamber relative to a vessel pressure of the pressure vessel and a control piston which can be moved between a control piston closed position and a control piston open position, wherein the closing piston is arranged in the closing piston closed position with the valve seat seal on the valve seat in a fluid-tight manner so that the valve output opening is sealed relative to the valve input opening, wherein the closing piston is arranged in the closing piston open position spaced apart from the valve seat, so that the valve output opening and the valve input opening are in pressure connection, wherein the control piston in the control piston closed position seals a pressure channel between the high pressure chamber and the low pressure chamber in a fluid-tight manner, and wherein the control piston in the control piston open position releases the pressure channel, so that the high pressure chamber and the low pressure chamber are in pressure connection.

14 Claims, 16 Drawing Sheets

(51) Int. Cl.
  *A62C 35/64* (2006.01)
  *F16K 1/30* (2006.01)
  *F16K 17/38* (2006.01)
  *F16K 31/383* (2006.01)
  *G05D 16/10* (2006.01)

(56) References Cited

U.S. PATENT DOCUMENTS

| | | | |
|---|---|---|---|
| 6,871,802 B2 * | 3/2005 | Stilwell et al. | 239/583 |
| 6,955,226 B2 * | 10/2005 | Akins et al. | 169/19 |
| 7,398,793 B2 | 7/2008 | Itano et al. | |
| 8,020,833 B2 | 9/2011 | Sun et al. | |
| 8,079,567 B2 * | 12/2011 | Beucher et al. | 251/28 |

FOREIGN PATENT DOCUMENTS

| | | |
|---|---|---|
| DE | 102 32 740 A1 | 2/2004 |
| EP | 0 666 087 A1 | 8/1995 |
| EP | 1 031 901 A1 | 8/2000 |
| EP | 1 591 144 A1 | 11/2005 |
| GB | 2 439 338 A | 12/2007 |
| WO | 97/34659 A1 | 9/1997 |
| WO | 01/80955 A1 | 11/2001 |
| WO | 2007/073390 A1 | 6/2007 |

* cited by examiner

VALVE

CROSS REFERENCE TO RELATED APPLICATIONS

This application is a United States National Phase application of International Application PCT/EP2011/057259 and claims the benefit of priority under 35 U.S.C. §119 of German patent application Serial No. 10 2010 028 858.6, filed May 11, 2010, the entire contents of which are incorporated herein by reference.

FIELD OF THE INVENTION

The invention relates to a valve for a pressure vessel of an automatic fire extinguishing system.

BACKGROUND OF THE INVENTION

Fire extinguishing systems of this kind have been known for quite a long time through prior use. They comprise a pressure vessel comprising a fire extinguishing medium such as for example $N_2$, the fire extinguishing medium being stored in the pressure vessel under a pressure of up to several 100 bar. The pressure vessel is closed by a valve, to which a sensor line is connected for the automatic detection of a fire and for triggering an extinguishing process and to which an extinguishing line is connected for delivering the fire extinguishing medium during the extinguishing process. A pressure switch can be used to monitor the pressure in the fire extinguishing system and a signal generating system to be triggered as a function of the system pressure. The pressure switch can be connected directly to the valve.

SUMMARY OF THE INVENTION

The problem addressed by the invention is to provide a valve for a pressure vessel of an automatic fire extinguishing system which has improved functionality when in use and at the same time is simple and compact.

The objective is achieved by a valve for a pressure vessel of an automatic fire extinguishing system, comprising a valve housing with a valve output opening for connecting an extinguishing line, a valve input opening for connecting the valve to the pressure vessel, a valve seat arranged between the valve output opening and the valve input opening, a low pressure chamber for connecting a triggering device and a high pressure chamber which is connectable to the low pressure chamber, wherein arranged in the valve housing is a closing piston comprising a valve seat seal which closing piston is movable between a closing piston closed position and a closing piston open position, a pressure control unit in pressure connection with the valve input opening and the low pressure chamber for controlling a low pressure in the low pressure chamber relative to a vessel pressure of the pressure vessel and a control piston which is movable between a control piston closed position and a control piston open position, wherein the closing piston in the closing piston closed position is arranged with the valve seat seal on the valve seat in a fluid-tight manner, so that the valve output opening is sealed relative to the valve input opening, wherein the closing piston is arranged in the closing piston open position spaced apart from the valve seat, so that the valve output opening and the valve input opening are in pressure connection, wherein the control piston in the control piston closed position seals a pressure channel between the high pressure chamber and the low pressure chamber in a fluid-tight manner, and wherein the control piston in the control piston open position releases the pressure channel, so that the high pressure chamber and the low pressure chamber are in pressure connection. The core concept of the invention is to arrange a pressure control unit in a valve housing to control the low pressure in a low pressure chamber of the valve housing relative to the vessel pressure of the pressure vessel. In addition, the pressure control unit is in pressure connection with the pressure vessel via a valve input opening and with the low pressure chamber. The low pressure chamber is used for connecting a triggering device, in particular a sensor line. Since there is low pressure, in particular reduced low pressure, controlled relative to the vessel pressure because of the pressure control unit in the low pressure chamber, the effect of pressure on the valve and sensor line are reduced. Furthermore, the safety risk and the risk of damage to the components affected by the lower pressure are reduced. The valve housing also comprises a valve output opening for connecting an extinguishing duct, whereby the valve output opening and the valve input opening are connected via a valve seat. A closing piston comprises a valve seat seal and can be moved between a closing piston closed position and a closing piston open position. In the closing piston closed position the closing piston is arranged with the valve seal fluid-tight on the valve seat, so that the valve output opening is sealed relative to the valve input opening. In the closing piston open position the closing piston is arranged spaced apart from the valve seat, so that the valve output opening and the valve input opening are in pressure connection. Furthermore, the valve housing comprises a high pressure chamber connectable with the low pressure chamber, wherein the connection of the chambers is made depending on the position of a control piston movable in the valve housing. In a control piston closed position of the control piston a pressure channel is sealed in a fluid-tight manner between the high pressure chamber and the low pressure chamber and in a control piston open position the pressure channel is released by the control piston, so that the high pressure chamber and the low pressure chamber are in pressure connection. The closing piston, which preferably connects the valve input opening to the high pressure chamber via a pressure equalization bore, enables the direct filling of the pressure vessel via the valve through the valve output opening, to which a corresponding filling line is connected. During the filling process the closing piston is moved owing to the dynamic filling pressure from the closing piston closed position into the closing piston open position, so that the valve output opening and the valve input opening are in pressure connection with one another. At the same time during the operation of the valve the closing piston in the closing piston closed position closes the valve output opening and thereby prevents in the operating position of the valve in an untriggered state fire extinguishing medium from being released through the valve output opening. By means of the control piston a pressure connection can be prevented between the low pressure chamber and the high pressure chamber, so that the two chambers are separated from one another in terms of pressure. In this way the pressurizing of the low pressure chamber with the reduced low pressure compared to the vessel pressure is made possible. The separation of the two chambers from one another is performed by the control piston as a function of the pressure in the low pressure chamber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
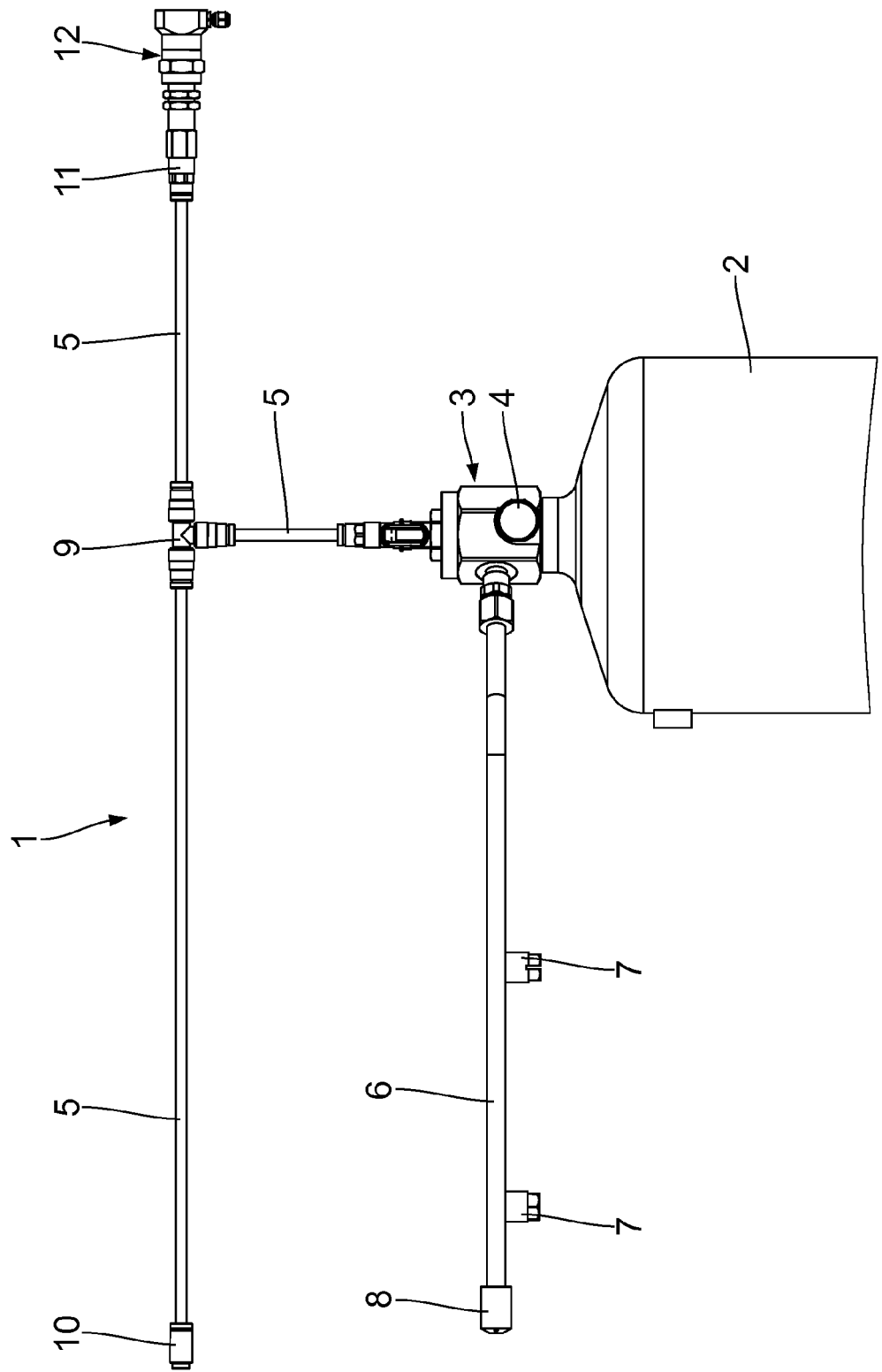
FIG. 1 is a schematic view of an automatic fire extinguishing system with a valve fitted onto a pressure vessel.
Figure 2:
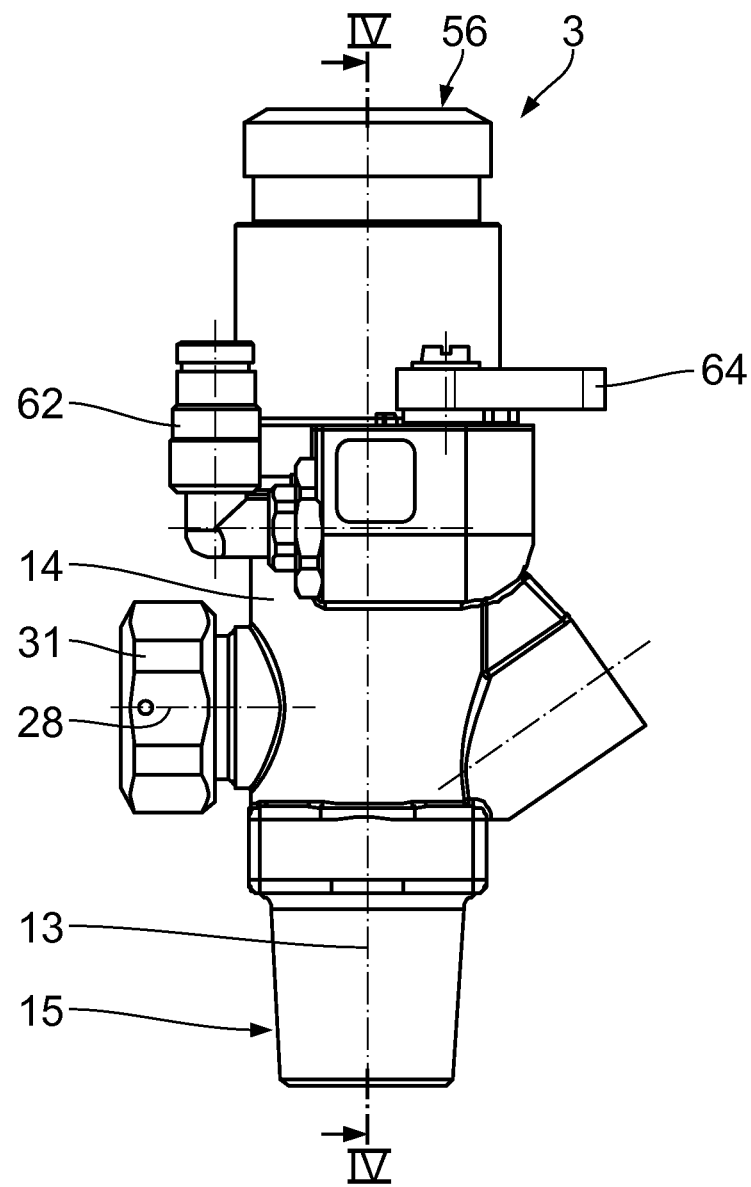
FIG. 2 is a side view of the valve according to the invention in an unpressurized state.
Figure 3:
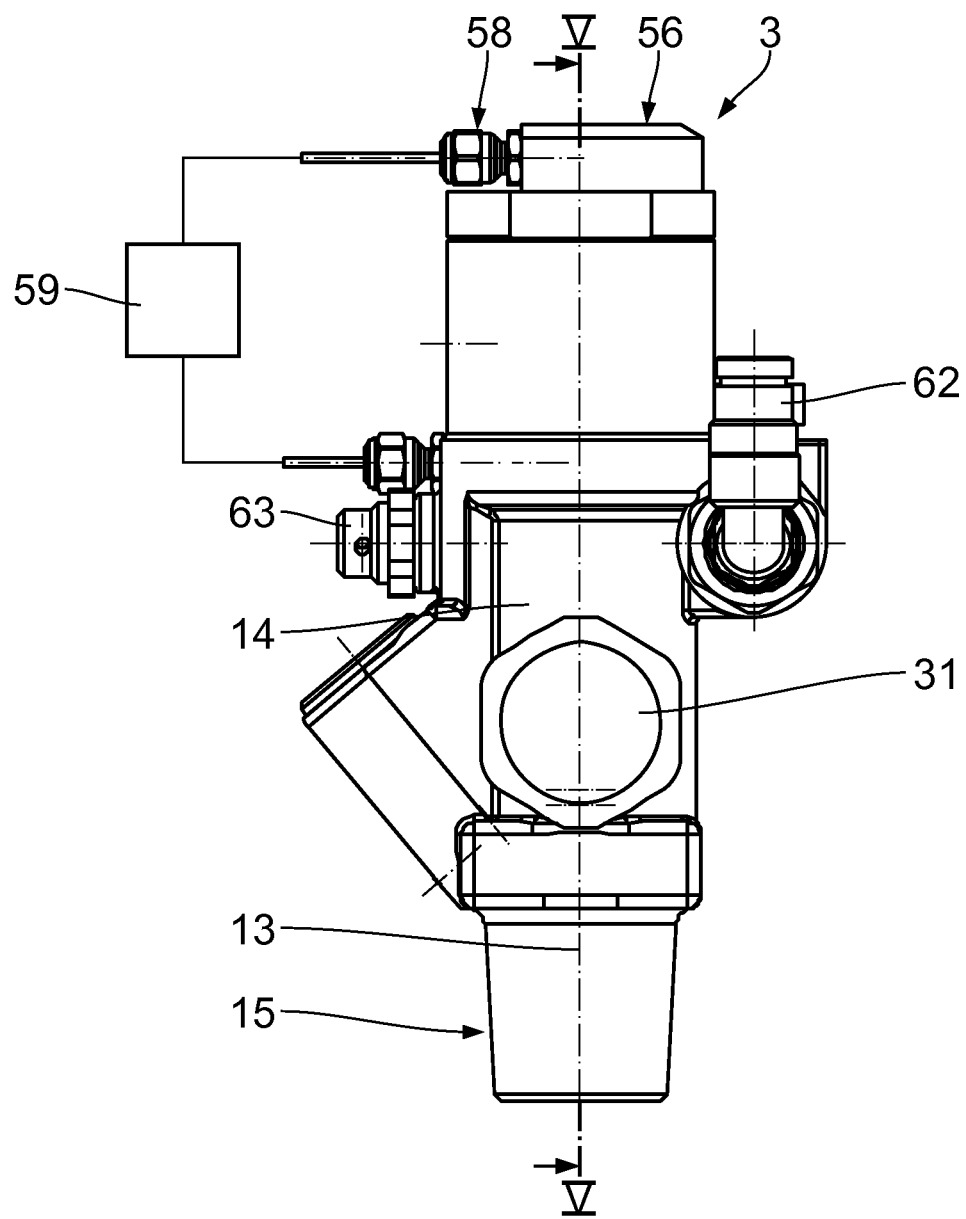
FIG. 3 is a side view of the valve corresponding to FIG. 2 and rotated 90° relative to a longitudinal axis of the valve.

An automatic fire extinguishing system 1 shown schematically in FIG. 1 comprises a pressure vessel 2 for storing a fire-extinguishing medium, in particular nitrogen ($N_2$). A valve 3 is fitted onto the pressure vessel 2, in particular screwed on, onto which a pressure measuring device 4 is attached. A triggering device 5 in the form of a sensor line for the automatic detection of a fire for triggering an extinguishing process and an extinguishing line 6 for delivering the fire extinguishing medium during the extinguishing process are connected via the valve 3 to the pressure vessel 2. The extinguishing line 6 comprises several extinguishing nozzles 7 for releasing the fire extinguishing medium. At the opposite end of the extinguishing line 6 connected to the valve 3 a closing plug 8 is provided for closing the extinguishing duct 6 in a fluid-tight manner. It is also possible to use an additional extinguishing nozzle 7 instead of the closing plug 8.

The sensor line 5 is laid in the area of one or more objects to be protected and is pressurized by the pressure vessel 2 via the valve 3 by a system pressure $p_{sys}$, which in particular is reduced compared to a vessel pressure $p_B$, at which the fire extinguishing medium is stored in the pressure vessel 2. The system pressure $p_{sys}$ is typically 15 to 20 bar, wherein the vessel pressure $p_B$ in the pressure vessel can be for example up to 360 bar. The filling process of the pressure vessel 2 and the sensor line 5 will be explained in more detail below. The sensor line 5 is in the form of a plastic hose and is branched by means of a T-connection piece 9. Depending on the sensor line configuration to be laid various different connecting pieces can be used, which are known for connecting hoses, in order to provide arrangements of the sensor line 5 of any length and/or any configuration. The plastic hose can be laid flexibly in the area of risk for the objects to be protected and as an integral component of the fire extinguishing system 1 does not need any external power supply to identify fire and activate extinguishing systems. The required pressure is provided via the pressure vessel 2 and the valve 3 by the system pressure $p_{sys}$. In the case of a fire the sensor hose bursts at its hottest point. The drop in pressure caused by this leads to the activation of the extinguishing system. By means of the configuration of the triggering device 5 as a sensor line a linear monitoring and detection of a source of fire in the vicinity of objects to be protected is made possible. Furthermore, flexible laying in the risk areas of objects to be protected is ensured. In addition, a high degree of safety is achieved by means of a simple structure and simple principle of functioning and low failure rate of the triggering device 5. The sensor line functions self-sufficiently without an external power supply. One end of the sensor line 5 is closed in a fluid-tight manner by a closing element 10. In addition, a pressure switch 12 is connected to the sensor line 5 via a line end connection element 11 for triggering a switching signal as a function of the system pressure psys in the fire extinguishing system 1. Furthermore, it is also possible to connect the pressure switch 12 directly to the valve 3 of the pressure vessel 2 or to integrate it into the valve 2. With the integration of the pressure switch 12 into the valve 2 the number of interfaces and details in the whole arrangement are reduced, so that as a result the tightness of the seal of the whole system is improved.

In the following with reference to FIGS. 2 to 7 the valve 3 is described in more detail in an unpressurized state. The valve 3 comprises a valve housing 14 with a longitudinal axis 13. The valve 3 is designed to be essentially hollow-cylindrical and comprises at one end shown at the bottom in FIGS. 4 and 5 a connection point 15 for connecting the valve 3 to the pressure vessel 2. According to the shown exemplary embodiment the connection point 15 is configured to be conical along the longitudinal axis 13. It is also possible to design the connection point 15 to be cylindrical and to have a screw-in thread for screwing into the pressure vessel 2. At the bottom end of the connection point 15 facing the pressure vessel 2, the valve 3 has a valve input opening 16, through which the fire extinguishing medium in the pressure vessel 2 can flow through the valve input channel 17 into the valve 3. A pressure measuring channel 18 is connected directly to the valve input channel 17, in which pressure measuring channel a connection 19 is provided for the pressure measuring device 4.

Figure 5:
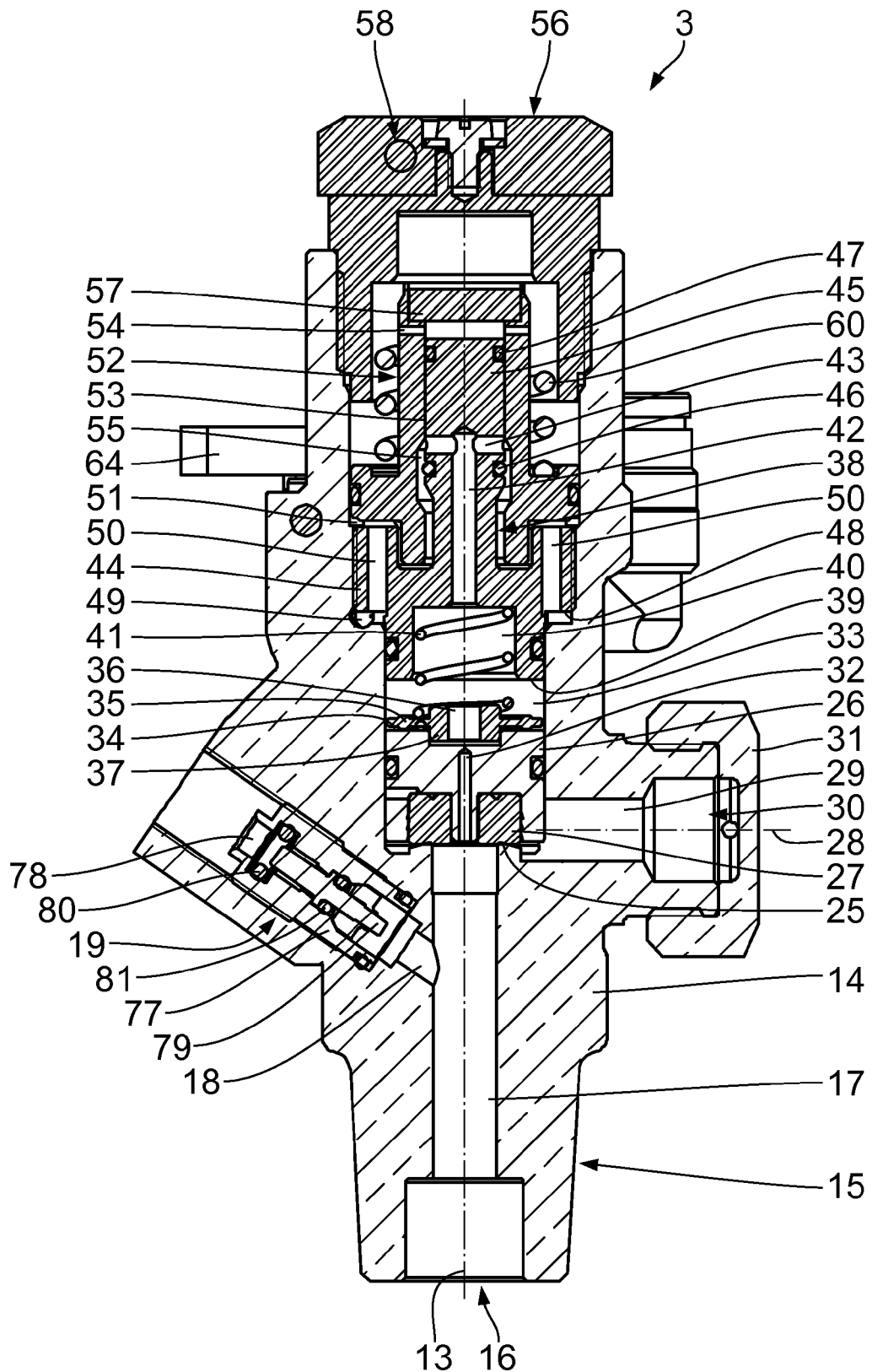
FIG. 5 is a longitudinal cross sectional view according to the section line V-V of FIG. 3.

For example a pressure measuring device 4 can be connected to the connection 19 shown by way of example in FIG. 5, even if the pressure vessel 2 is already under operating pressure or is in the process of being filled for example. This is achieved in that the connection 19 comprises a valve insert sleeve 77, which is screwed into the pressure measuring channel 18. In the valve insert sleeve 77 a valve insert through channel 78 is formed, in which a closing ram 79 is provided for closing and opening the valve insert through channel 78. Furthermore, an external sealing element 80 facing away from the pressure measuring device 4, in particular an O-Ring, is provided for connecting the pressure measuring device 4 with the valve insert sleeve 77 in a gas-tight manner. In this way it is possible to assemble the pressure measuring device 4 into the valve insert sleeve 77 of the connection 19 even with increased vessel pressure $p_B$ of the pressure vessel 2, without the fire extinguishing medium escaping from the pressure vessel 2 in an uncontrolled manner. In this way damage is also avoided during the assembly and disassembly of the pressure measuring device 4 to the pressure measuring device 4 and/or the valve 3. In particular, a user is not exposed to any risk associated with a seal being ejected at high pressure or the escape of fire extinguishing medium and associated noise. The assembly and disassembly of the pressure measuring device 4 may be necessary for example, if instead of the pressure measuring device 4 a different connection element is to be mounted on the connection 19. However, the dismantling of the pressure measuring device 4 is practical for example during the transport of the pressure vessel 2 to avoid damage to the pressure measuring device 4 during the transport or loading onto and unloading from transport means.

Furthermore, an inner sealing element 81 is provided by means of which the pressure measuring channel 18 is sealed from the environment in a gas-tight manner in the arrangement of the connection 19 shown in FIG. 5. In the arrangement shown in FIG. 5 the closing ram 79 in the valve insert sleeve 77 is located in a closing position. When connecting the pressure measuring device 4 to the connection 19 firstly the valve insert through channel 78 is sealed by a not shown connection point of the pressure measuring device 4 and seals the outer sealing element 80 in a gas-tight manner. Only then is the closing ram 79 activated by the connection point of the pressure measuring device 4 such that the valve insert through channel 78 is opened by moving the closing ram 79 in the direction of the valve input channel 17 and fire extinguishing medium under vessel pressure $p_B$ flows to the pressure measuring device.

Figure 4:
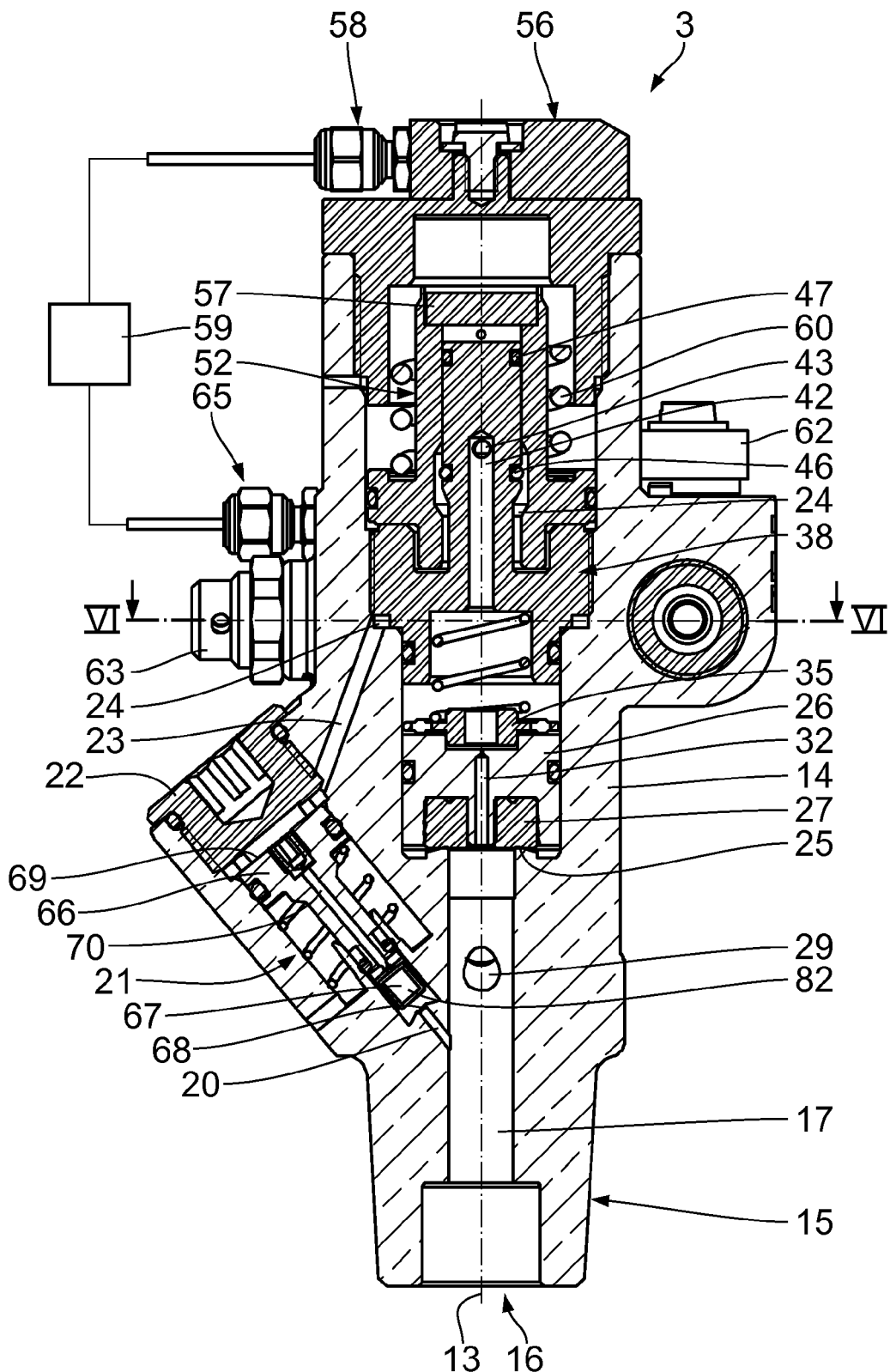
FIG. 4 is a longitudinal cross sectional view according to the section line IV-IV of FIG. 2.

Likewise a pressure control channel 20 for the pressure connection of a pressure control unit 21 with the valve input channel 17 and thereby the pressure vessel 2 is also connected directly to the valve input channel 17. As shown in FIG. 4, the pressure control channel 20 is sealed by a screw-on pressure control unit seal 22 from the environment. The pressure control unit 21 is connected via a low pressure channel 23 to a low pressure chamber 24.

The valve input channel 17 comprises a valve seat 25 concentric to the longitudinal axis 13, on which according to FIGS. 4 and 5 a closing piston 26 is arranged in a sealing manner with a valve seat seal 27.

A valve output channel 29 comprising an output channel longitudinal axis 28 with a valve output opening 30 is connected to the valve input channel 17 such that the longitudinal axis 13 and the output channel longitudinal axis 28 intersect at a 90° angle. It is also possible that the two longitudinal axes 13, 28 run at right angles to one another and an angle enclosed by the longitudinal axes 13, 28 is greater than 0° and smaller than 90°. The valve seat 25 is arranged at a transition between the valve output channel 29 and the valve input channel 17 and thus between the valve output opening 30 and the valve input opening 16. In the embodiment of the valve 3 shown in FIGS. 2 to 7 a valve cap 31 is screwed onto the valve output channel 29 on the valve output opening 30, in order to protect the valve output opening 30 during the transport of the valve 3 from dirt and/or damage and in the case of unintentionally opening the valve to avoid the risk of an controlled rapid escape of gas.

In the arrangement of the closing piston 26 shown in FIGS. 4 and 5 the latter is arranged in a closing piston closed position, wherein the valve seat seal 27 is arranged in a fluid-tight manner on the valve seat 25 and thus the valve input opening 16 is sealed from the valve output opening 30. The two openings 16, 30 are separated from one another in terms of pressure in the closing piston closed position.

The closing piston 26 is sealed in the valve housing 14 and can be moved along the longitudinal axis 13. The closing piston 26 comprises a pressure equalization bore 32, which is arranged concentrically to the longitudinal axis 13. At one end of the pressure equalization bore 32 facing away from the valve input channel 17 the latter has a cross section that is reduced perpendicular to the longitudinal axis 13, so that the flow of fire extinguishing medium from the valve input channel 17 through the pressure equalization bore 32 into a high pressure chamber 33 is made possible. The high pressure chamber 33 has a cross section which is larger than the longitudinal axis 13 compared to a corresponding cross section of the valve input channel 17, so that with a pressure equilibrium in the valve input channel 17 and the high pressure chamber 33 the closing piston 26 is pressed onto the valve seat 25 owing to the greater pressure cross sectional area in the high pressure chamber 33.

On an end face 34 of the closing piston 26 opposite the valve seat seal 27 a damping element 35 is provided. The damping element 35 is configured to be in the form of an annular disk with a central bore 36, which is arranged to be concentric to the pressure equalization bore 32 and thus together with the pressure equalization bore 32 forms a common flow channel for the fire extinguishing medium or pressure medium from the valve input channel 17 into the high pressure chamber 33. In the view according to FIGS. 4 and 5 the damping element 35 fits against the end face 34 of the closing piston 26. With a central section 37, which compared to an edge section of the damping element 35 has an increased thickness along the longitudinal axis 13, the damping element 35 is centered in a corresponding recess of the end face 34 of the closing piston 26 relative to the longitudinal axis 13.

An intermediate element 38 is screwed into the valve housing 14 such that with a lower end face 39 it faces the damping element 35. The damping element 35 is thus arranged between the closing piston 26 and the intermediate element 38. Coming from the end face 39 a cylindrical recess 40 is provided on the intermediate element 38 in which recess a closing piston spring 41 is held guided. The closing piston spring 41 has an internal diameter which is greater than a diameter of the central section 37 of the damping element 35, so that the damping element 35 can penetrate with the central section 37 into an internal chamber surrounded by the closing piston spring 41. The closing piston spring 41 is arranged between the intermediate element 38 and the damping element 35 and acts with spring force on the closing piston 26 along the longitudinal axis 13 in the direction of the valve seat 25. The damping element 35 is used for damping any impact on the closing piston 26 moved away by the valve seat 25 against the intermediate element 38.

A pressure channel is arranged in extension of the recess 40 and concentric to the longitudinal axis 13, which pressure channel comprises a longitudinal bore 42 arranged along the longitudinal axis 13 and a transverse bore 43 aligned transversely thereto, in particular perpendicular thereto.

The intermediate element 38 is configured essentially to be hollow cylindrical with base 44, which has a corresponding external thread for screwing the intermediate element 38 into the valve housing 14. From the base 44 a lower section extends along the longitudinal axis 13 which is delimited by the recess 40 and the lower end face 39. The lower section of the intermediate element 38 is sealed from the valve housing 14. Furthermore, the intermediate element 38 has a pressure channel column 45 extending upwards from the base 44 along the longitudinal axis. On an outer casing surface of the pressure channel column 45 a lower sealing element 46 and an upper sealing element 47 are arranged in corresponding grooves. The sealing elements 46, 47 are arranged spaced apart from one another along the longitudinal axis 13. The transverse bore 43 of the pressure channel is arranged along the longitudinal axis 13 between the two sealing elements 46, 47. The intermediate element 38 is screwed into the valve housing 14 such that a cavity 49 is formed adjacent to a lower end face 48 of the base 44 between the intermediate element 38 and the valve housing 14. The cavity 49 is part of the low pressure chamber 24 and is connected via the low pressure channel 23 to the pressure control unit 21. The cavity 49 is connected via two low pressure bores 50 aligned parallel to the longitudinal axis 13 to an inner chamber 51 of the valve housing 14 arranged above the intermediate element 38. Accordingly also the inner chamber 51 is part of the low pressure chamber 24.

The inner chamber 51 is limited in radial direction in relation to the longitudinal axis 13 by the valve housing 14, in axial direction in relation to the longitudinal axis 13 in the direction of the valve input opening 16 by the intermediate element 38 and in an axially opposite direction by a control piston 52. The control piston 52 is configured to be essentially hollow cylindrical, wherein in a guiding section 53 of the control piston 52 the latter is guided on the pressure channel column 45 of the intermediate element 38 and sealed by the sealing elements 46, 47. The control piston 52 is sealed on an outer casing surface from the valve housing 14. In the guiding section 53 in an upper area facing away from the intermediate element 38 a plurality of transverse ventilation bores 54 are provided. From the guiding section 53 along the longitudinal axis 13 in the direction of the intermediate element 38 a pressure connection section 55 is provided such that an internal diameter of the control piston 52 is greater than an external diameter of the lower sealing element 46 arranged on the pressure channel column 45, so that from the high pressure chamber 33 via the longitudinal bore 42 and the transverse bore 43 of the pressure channel and the pressure connection section 55 a pressure connection is formed to the low pressure chamber 24.

The control piston 52 is located according to the views in FIGS. 4 and 5 in a control piston open position. In the control piston open position the control piston 52 is spaced apart from a housing cover 56 screwed coaxially to the longitudinal axis 13 onto the valve housing 14 arranged along the longitudinal axis 13. On an upper end of the control piston 52 facing the housing cover 56 a permanent magnet 57 is arranged, which to trigger a switch signal works together with a signal generator 58 in the form of a reed switch, which is fixed in the housing cover 56. The signal generator 58 is used to identify the triggering of an extinguishing process with the valve 3. The reed switch comprises in a known manner two reed contacts, not shown in more detail, which have respectively a semi-circular magnetic field, such that on the approach of the permanent magnet 57 the contacts are closed and thus a switching signal is triggered by the reed switch. The contacts remain closed or open—depending on the type of reed switch—as long as the permanent magnet 57 is located within at least one of the two semi-circular areas. As soon as the permanent magnet 57 leaves the semi-circular areas the reed contacts open or close. The boundary of the semi-circular areas at which the permanent magnet 57 leaves the switching areas of the reed switch is denoted as the switching distance and defines a switching position of the control piston 52. The signal generator 58 is in signal connection with a control/regulating unit 59 of the fire extinguishing system 1, shown only schematically, in order, for example when triggering an extinguishing process with the control/regulating unit 59, to switch off connected units and additional devices.

Between the control piston 52 and the housing cover 56 a control piston spring 60 is arranged which can exert spring force on the control piston 52 along the longitudinal axis 13 in the direction of the intermediate element 38. In the control piston open position shown in FIGS. 4 and 5 the control piston spring 60 is relaxed and exerts no or very little pretensioning force on the control piston 52.

Figure 6:
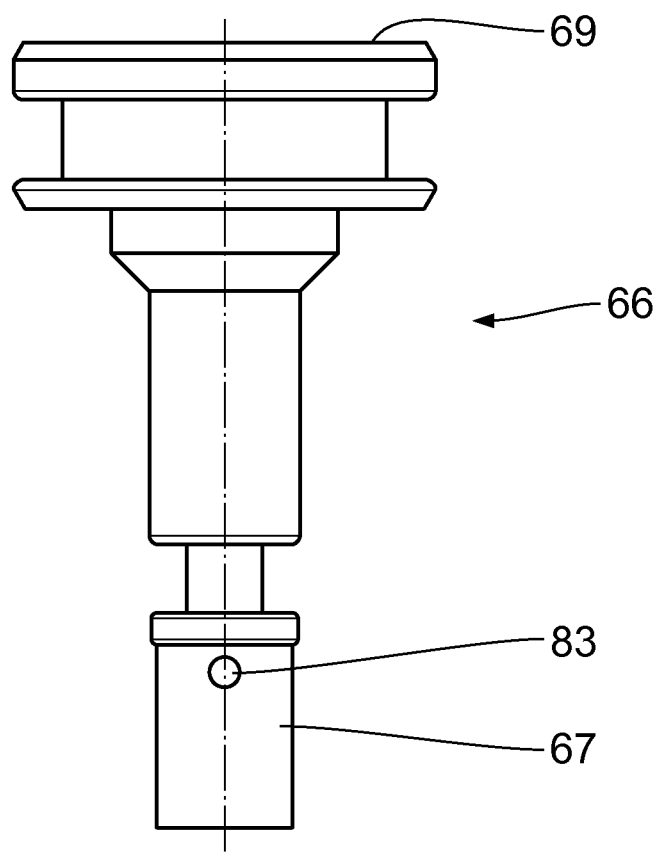
FIG. 6 is a side view of a pressure control piston according to FIG. 4.
Figure 7:
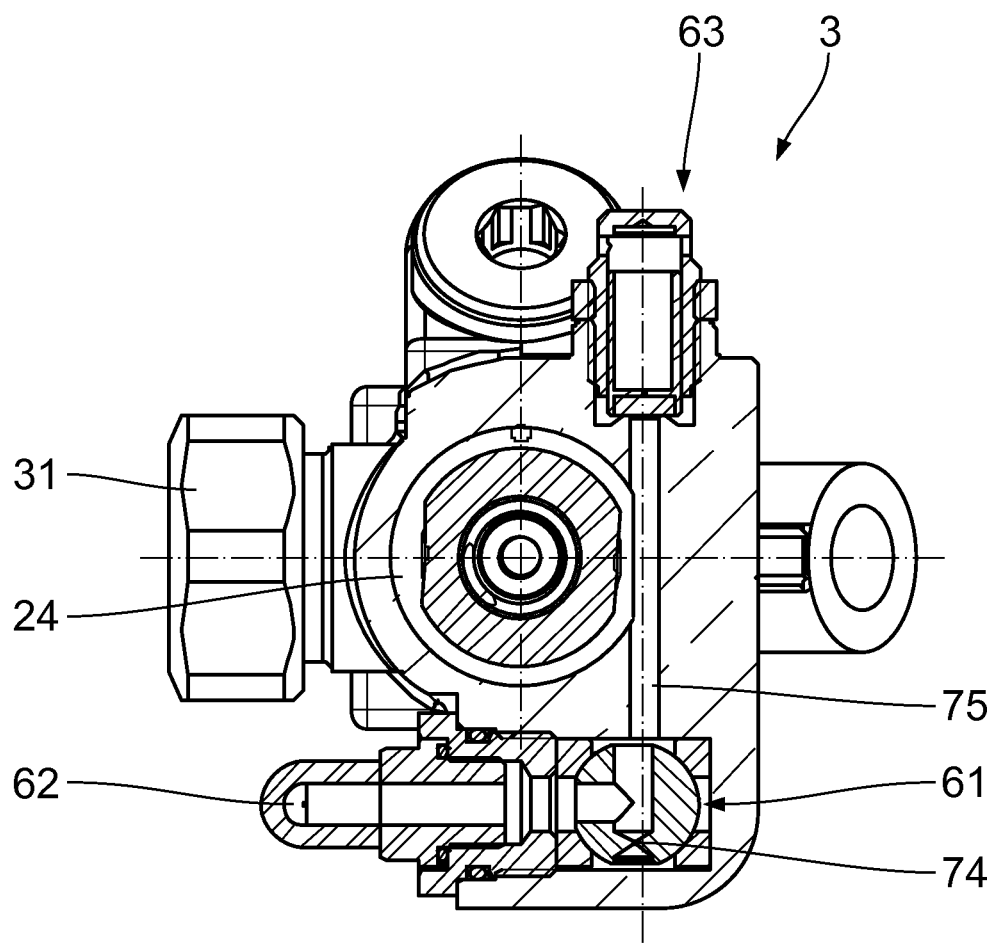
FIG. 7 is a cross sectional view according to the section line VI-VI of FIG. 4.

The low pressure chamber 24 is, as shown in FIG. 7, connected via a throttle/stop valve 61 to a release opening in the form of a push-in screw 62, onto which the triggering device, i.e. the sensor line 5, can be fitted. In FIGS. 2 to 7 the sensor line 5 is not connected to the valve 3.

For the equalization of the pressure of the valve 3 with the environment a spring-loaded discharge valve 63 is also connected to the low pressure chamber 24. The low pressure chamber 24 is connected via a low pressure transverse bore 75 installed in the valve housing 14 to the throttle/stop valve 61 and thereby connected to the push-in screw 62 and the sensor line 5. The low pressure transverse bore 75 also connects the discharge valve 63 to the throttle/stop valve 61. The throttle/stop valve 61 can be arranged from outside the valve housing 14 by means of a pivot lever 64 between a stop position, a throttle position and an open position. In addition the throttle/stop valve 61, which is configured as a ball stop valve, can be pivoted about a pivot axis running parallel to the longitudinal axis 13. The throttle/stop valve 61 is connected to the pivot lever 64 relative to the pivot axis in a non-rotatable manner. According to the view in FIG. 7 the throttle/stop valve 61 is in the open position, i.e. a pressure connection is provided from the low pressure chamber 24 via the throttle/stop valve 61 to the push-in screw 62 and thereby to the adjoining triggering device 5. To monitor the position of the pivot lever 64 and thereby a corresponding position of the throttle/stop valve 61 a further pivot lever signal generator 65 with a similar function is provided. Also the pivot lever signal generator 65 is connected to the central control/regulating unit 59.

In the following the pressure control unit 21 is described in more detail. The pressure control unit 21 comprises a pressure control piston 66 displaceable in a sealed manner along the pressure control channel 20, which piston can be arranged with a closing element 67 on a sealing seat 68 of the pressure control channel 20 such that the pressure control channel 20 is sealed from the valve input channel 17 and thereby from the pressure vessel 2. A pressure area acting in longitudinal direction of the pressure control channel 20 is limited by the seal seat 68, which pressure area acts on the closing element 67 such that the pressure control piston 66 is pushed by the closing element 67 away from the seal seat 68. Furthermore, the pressure control piston 66 comprises a pressure area 69 arranged opposite the closing element 67 which faces the low pressure channel 23 and the low pressure chamber 24 connected therewith. A low pressure $p_N$ acting on the pressure area 69 is smaller owing to the greater pressure area 69 compared to the pressure area delimited by the seal seat 68 than a vessel pressure $p_B$ in the valve input channel 17 and the pressure control channel 20 acting on the closing element 67. The low pressure $p_N$ corresponds to the system pressure $p_{sys}$, at which during the operation of the valve 3 the low pressure chamber 24 and the sensor line 5 are pressurized. The pressure control piston 66 is in static force equilibrium. In order to ensure the pressure connection of the pressure control channel 20 to the low pressure channel 23, the pressure control piston 66 has a connecting bore 70 concentric to the pressure control channel 20. The closing element 67 is arranged in the pressure control channel 20 such that, as soon as it no longer fits in a sealing manner against the seal seat 68 it can be flowed around by the fire extinguishing medium or pressure medium along the pressure control channel 20. In addition, the closing element 67 is configured in the form of a hollow rectangular frame, wherein an area 82 surrounded by the rectangular frame is connected to the connecting bore 70. In addition, a closing element transverse bore 83 arranged perpendicular to the connecting bore 70 is provided, so that a pressure connection is formed of the connecting bore 70 via the closing element transverse bore 83 around the closing element 67 into the pressure control channel 20, provided the seal seat 68 is not sealed by the closing element 67. Furthermore, the fire extinguishing medium or pressure medium can flow from the pressure control channel 20 via area 82 into the connecting bore 70 and from there via the low pressure channel 23 into the low pressure chamber 24. FIG. 6 shows the pressure control piston 66 in a side view corresponding to FIG. 4.

In the following the functions performed by the valve 3 are explained in more detail. According to the views shown in FIGS. 4, 5 and 7 the valve 3 is in an unpressurized basic state. The valve 3 is fitted onto the not shown pressure vessel 2, in particular screwed on. The pressure vessel 2 is emptied and is thus also pressureless. In this arrangement the pressure control unit 21 is in an open position, i.e. the closing element 67 is spaced apart from the seal seat 68. The closing piston 26 in the closing piston closed position, i.e. the closing piston 26 is fitted with the valve seat seal 27 in a sealing manner on the valve seat 25. The control piston 52 is located in the control piston open position, i.e. the pressure channel 42, 43 extending along the intermediate element 38 is connected via the pressure connection section 55 to the low pressure chamber 24. Furthermore, the throttle/stop valve 61 is located in the open position so that the low pressure chamber 24 is in pressure connection with the push-in screw 62 for connecting the not shown sensor line 5.

Figure 8:
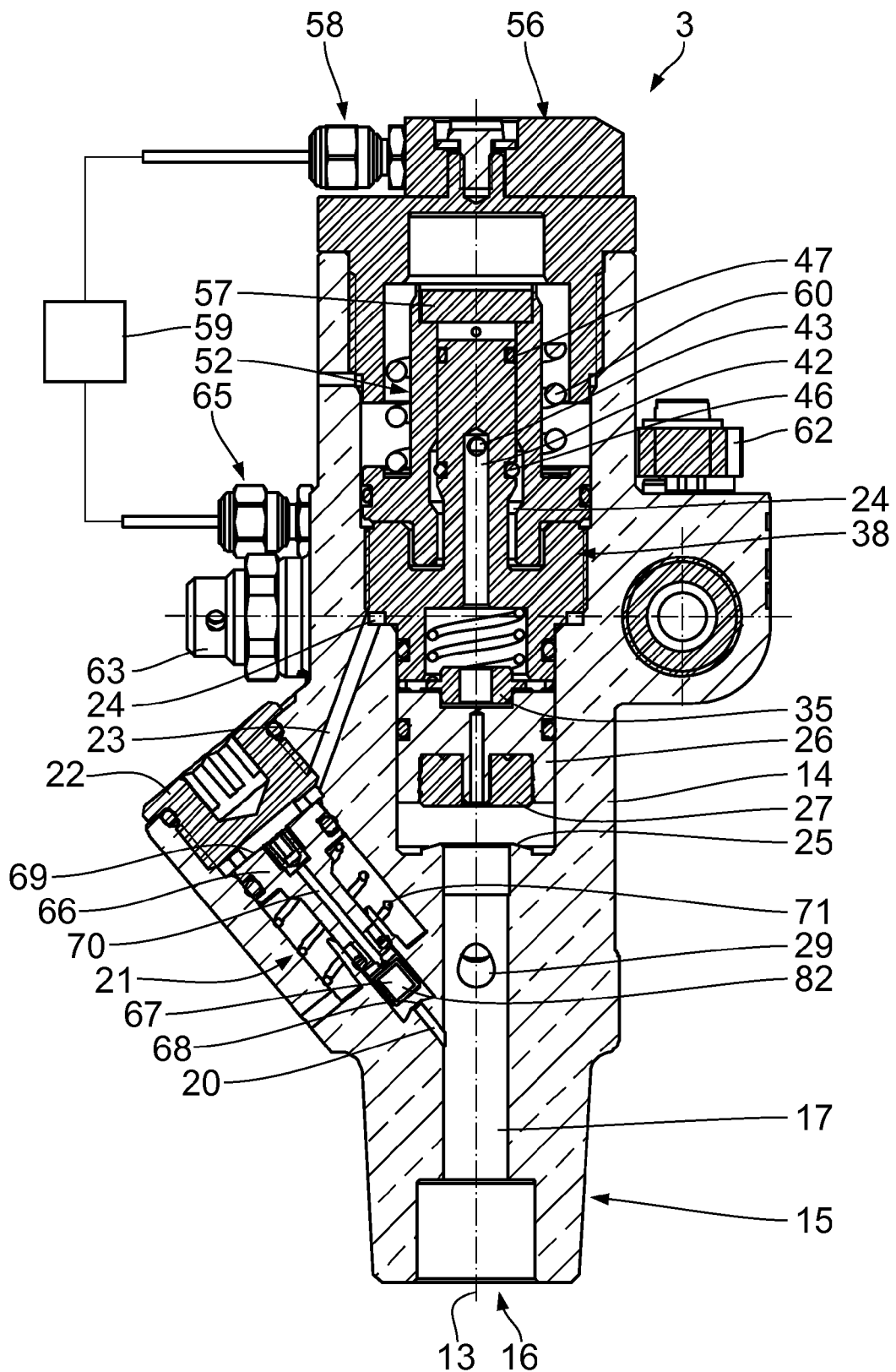
FIG. 8 is a longitudinal cross sectional view of the valve according to FIG. 4 during a filling process.
Figure 9:
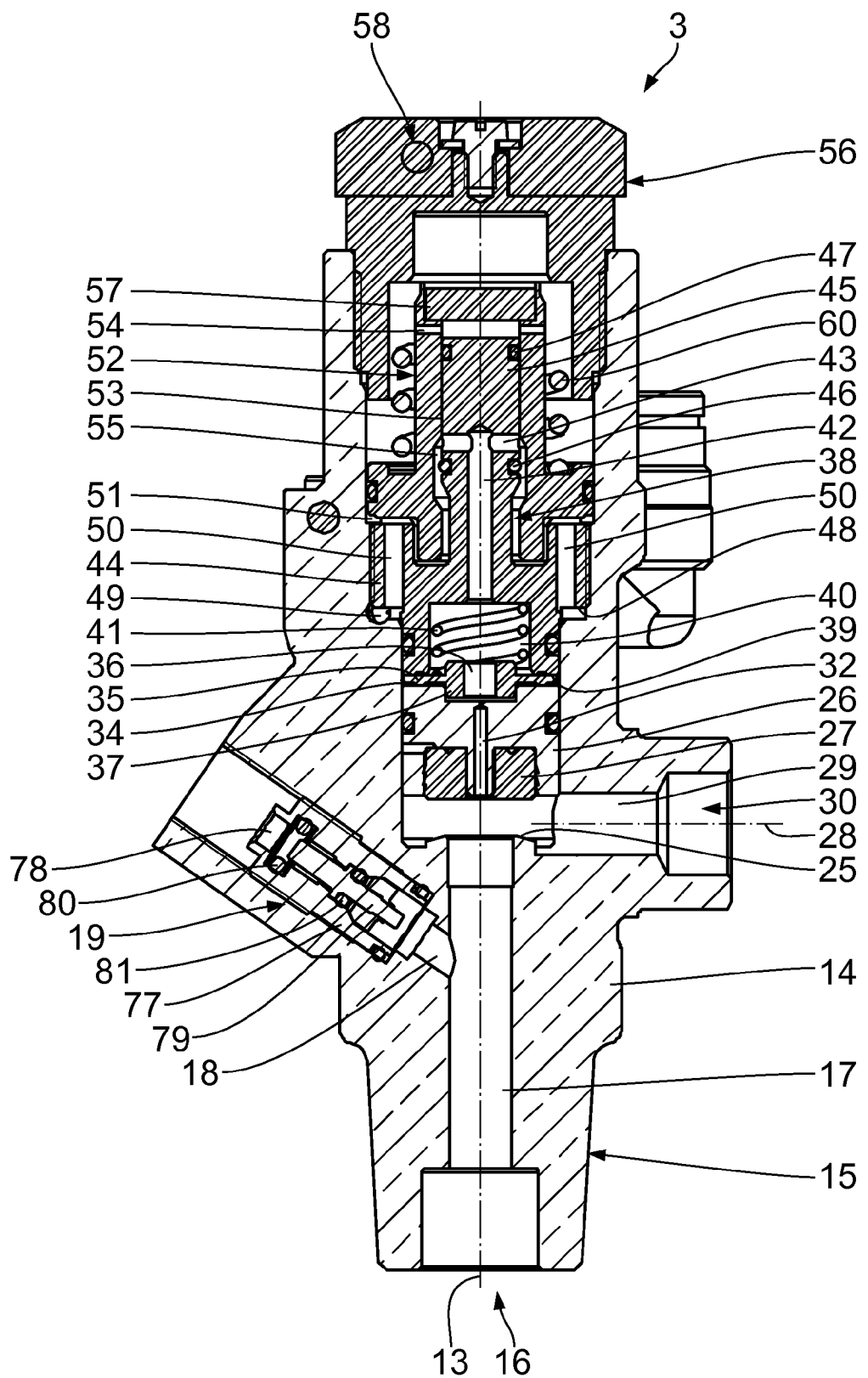
FIG. 9 is a longitudinal cross sectional view of the valve according to FIG. 5 during the filling process.
Figure 10:
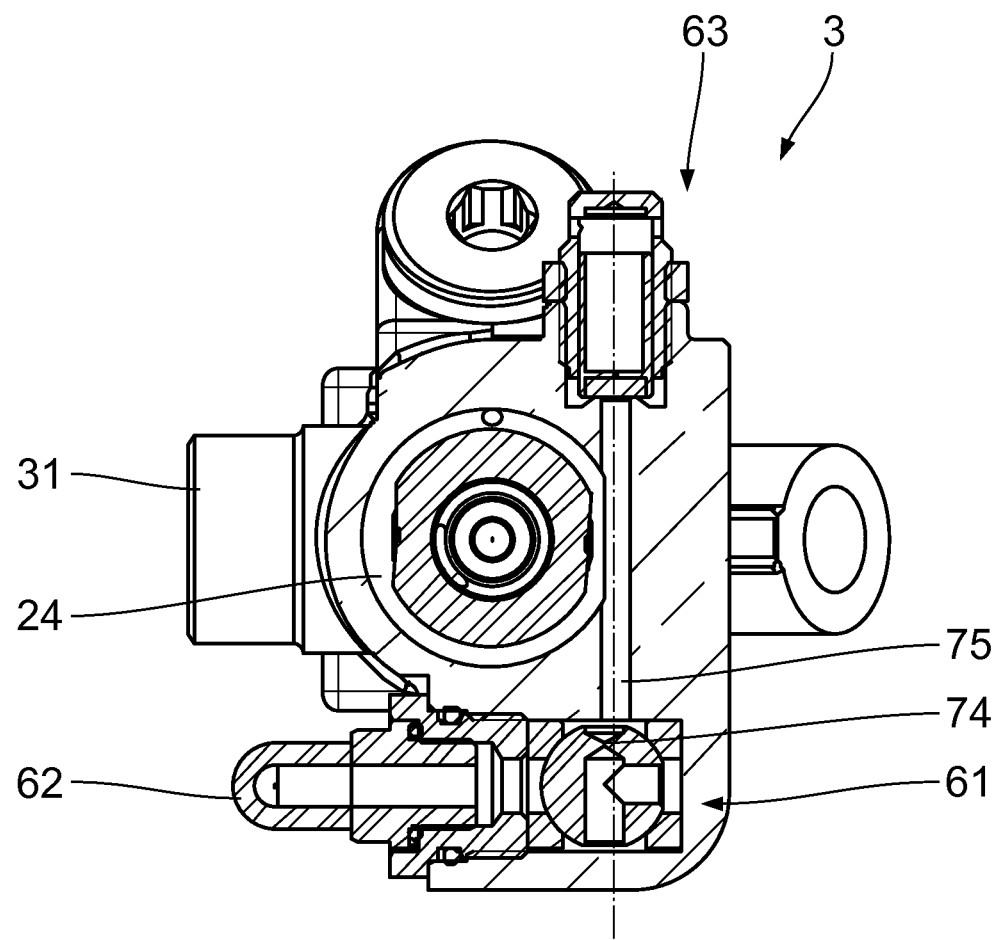
FIG. 10 is a cross sectional view of the valve according to FIG. 7 during the filling process.

During a filling process of the pressure vessel 2 shown in FIGS. 8 to 10 a not shown filling line is connected to the valve output opening 30 via the valve 3. Filling medium is conveyed at filling pressure $p_{fill}$ into the valve output channel 29. By way of the dynamic filling pressure $p_{fill}$ the closing piston 26 with the valve seat seal 27 is lifted from the valve seat 25 of the valve housing 14, so that the valve output channel 29 is connected to the valve input channel 17. Thus the fire extinguishing medium and/or the pressure medium reaches the not-shown pressure vessel 2 and, as the pressure control unit 21 is still in an open position, the fire extinguishing medium flows via the pressure control channel 20, the pressure control unit 21 and the low pressure channel 23 into the low pressure chamber 24. Because the throttle/stop valve 61 is in the stop position (FIG. 10), the low pressure chamber 24 is sealed from the surroundings on the push-in screw 62. This means that the pressure in the inner chamber 51, i.e. the pressure between the throttle/stop valve 61 and pressure control unit 21 on the one hand and between the throttle/stop valve 61 and closing piston 26 on the other hand, leads to a displacement of the control piston 52 along the longitudinal axis 13 from the control piston open position in the direction of the housing cover 56 into the control piston closed position.

Figure 11:
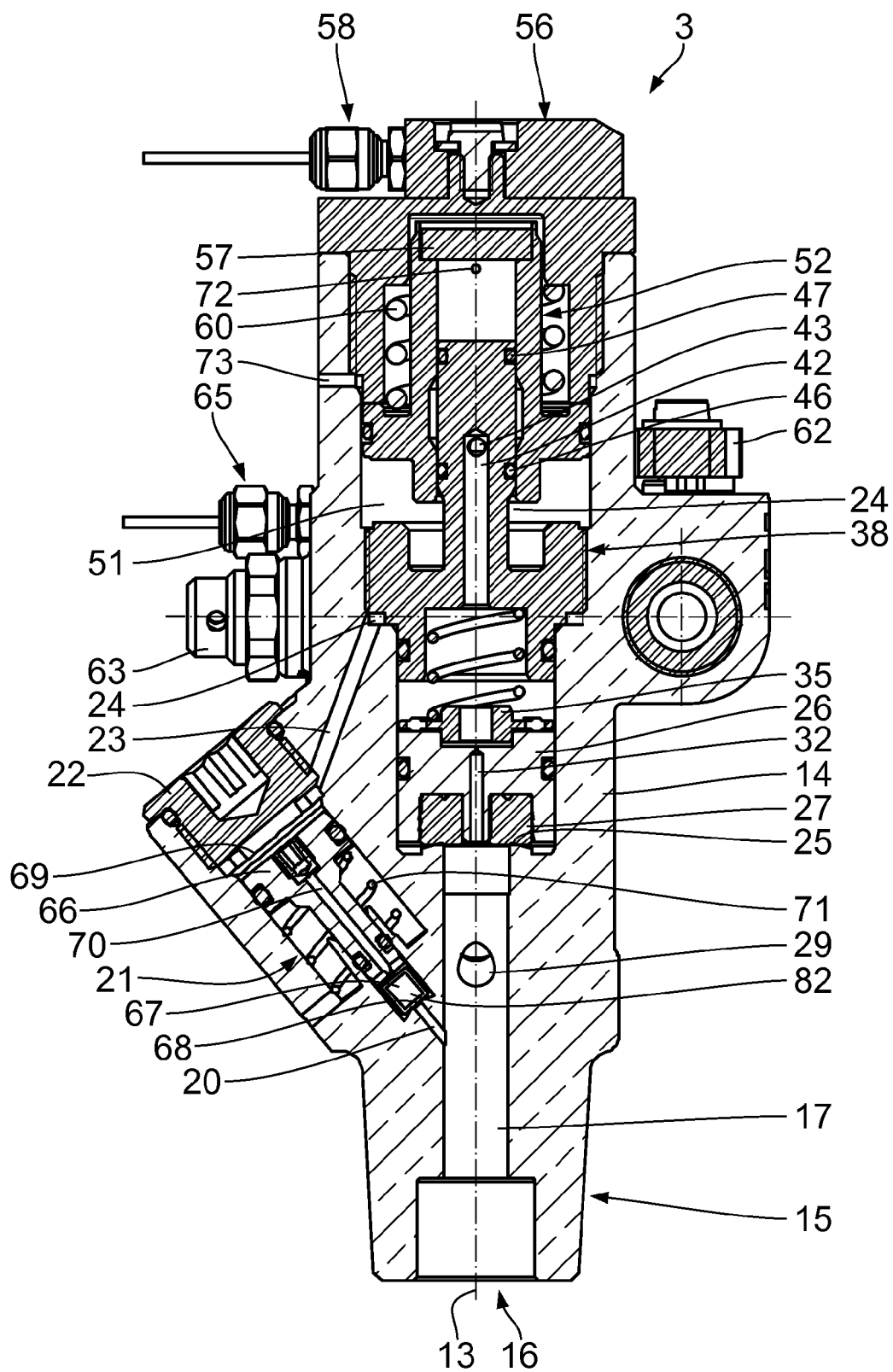
FIG. 11 is a longitudinal cross sectional view according to FIG. 8 after the completion of the filling process.
Figure 12:
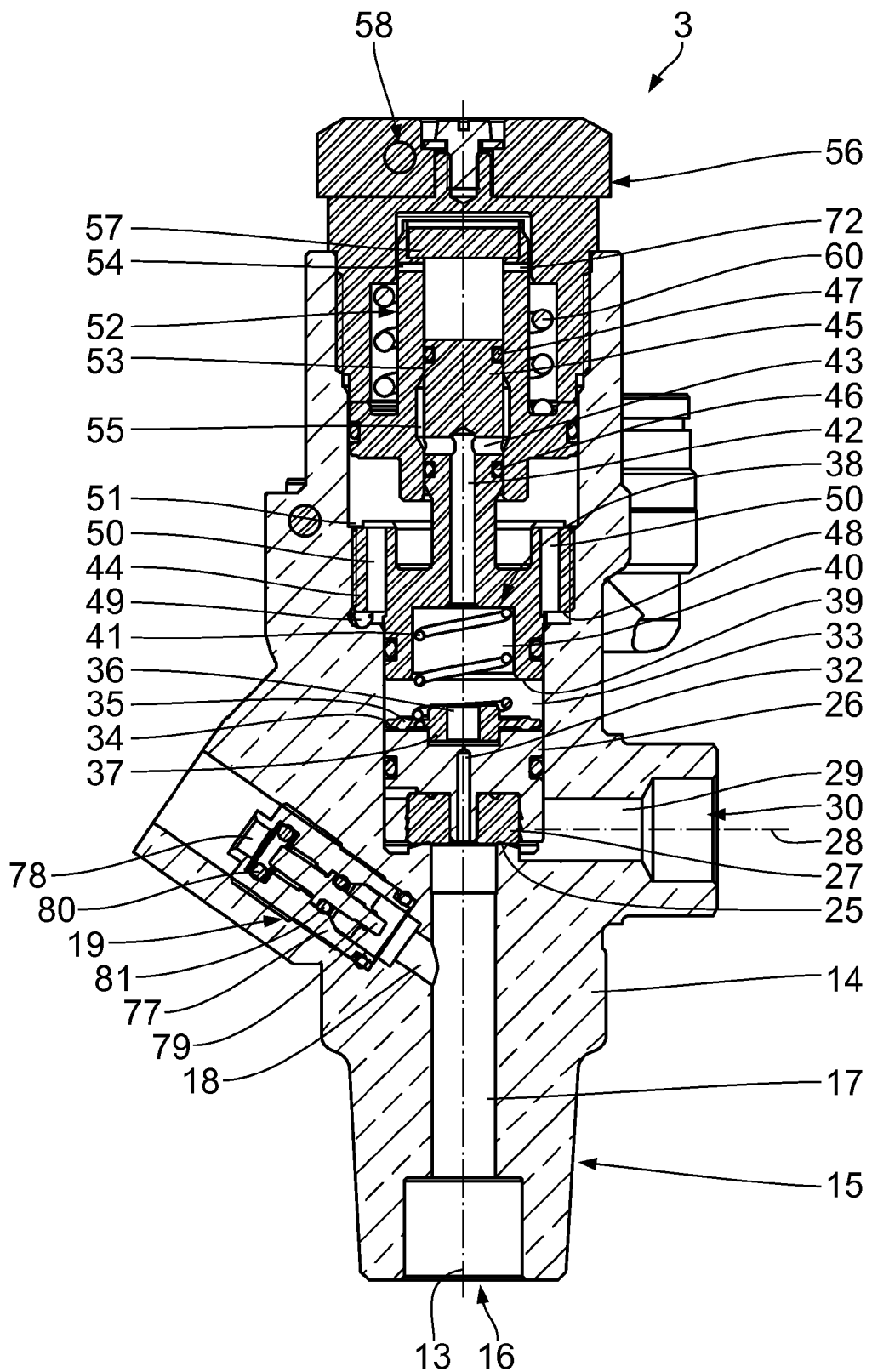
FIG. 12 is a longitudinal cross sectional view according to FIG. 9 after the completion of the filling process.

The control piston 52 reaches the control piston closed position, which is shown in FIGS. 11 and 12, according to the shown exemplary embodiment, as soon as the filling pressure $p_{fill}$ reaches about 4 bar. In the control piston closed position the two sealing elements 46, 47 are arranged respectively in the guiding section 53 of the control piston 52 such that a pressure connection of the pressure channel is sealed via the pressure connection section 55. Thus additional fire extinguishing medium or pressure medium cannot pass from the pressure vessel 2 via the pressure equalization bore 32 in the closing piston 26 to the throttle/stop valve 61.

The pressure control unit 21 is in an open position relative to the control piston 52 during the filling process until a later time, i.e. in the shown exemplary embodiment until the low pressure $p_N$ which acts on the pressure area 69 of the pressure control piston 66 reaches about 15 to 20 bar. This low pressure $p_N$ is sufficient to push the pressure control piston 66 with the closing element 67 onto the sealing seat 68 against the filling pressure in the pressure control channel 20 and to seal the pressure control channel 20. The low pressure $p_N$ thus acts on a so-called low pressure side of the pressure control piston 66, i.e. on the pressure area 69 of the pressure control piston 66, the low pressure channel 23, the low pressure chamber 24 with the inner chamber 51 and the low pressure bores 50. In this arrangement of the pressure control unit 21 a pressure control spring 71 is compressed by the pressure control piston 61 such that a reaction force of the pressure control spring 71 acts on the pressure control piston 66 against the low pressure $p_N$ acting on the pressure area 69.

In the control piston closed position the control piston 52 is arranged in an uppermost position in the valve housing 14 such that the control piston spring 60 is pressed together to the maximum and thus a reaction force acting on the control piston 52 along the longitudinal axis 13 acts in the direction of the intermediate element 38. By means of the displacement of the control piston 52 during the filling process from the bottom control piston open position into the upper control piston closed position any gas in the valve housing 14 and displaced by the movement of the control piston 52 can be vented and/or displaced through control piston venting bores 72 and/or through a valve housing venting bore 73. After completing the filling process, on reaching the desired filling pressure, by means of the controlled venting of the filling line by the valve output opening 30 the valve output channel 29 sealed by the closing piston 26 is also vented. In the view according to FIGS. 11 and 12 the filling process of the pressure vessel 2 is completed.

Figure 13:
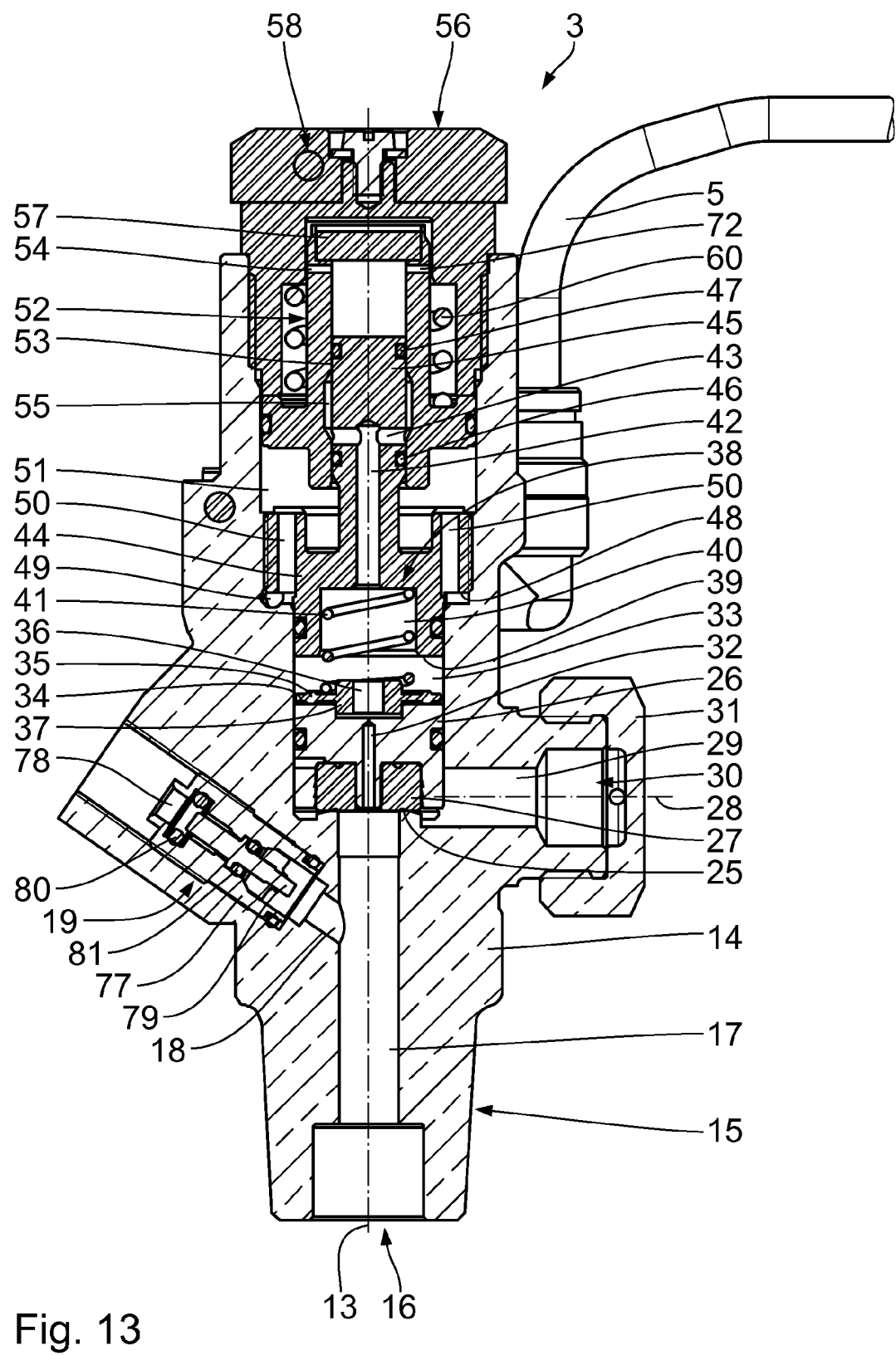
FIG. 13 is a longitudinal cross sectional view according to FIG. 12 with a sensor line connected to the valve.
Figure 14:
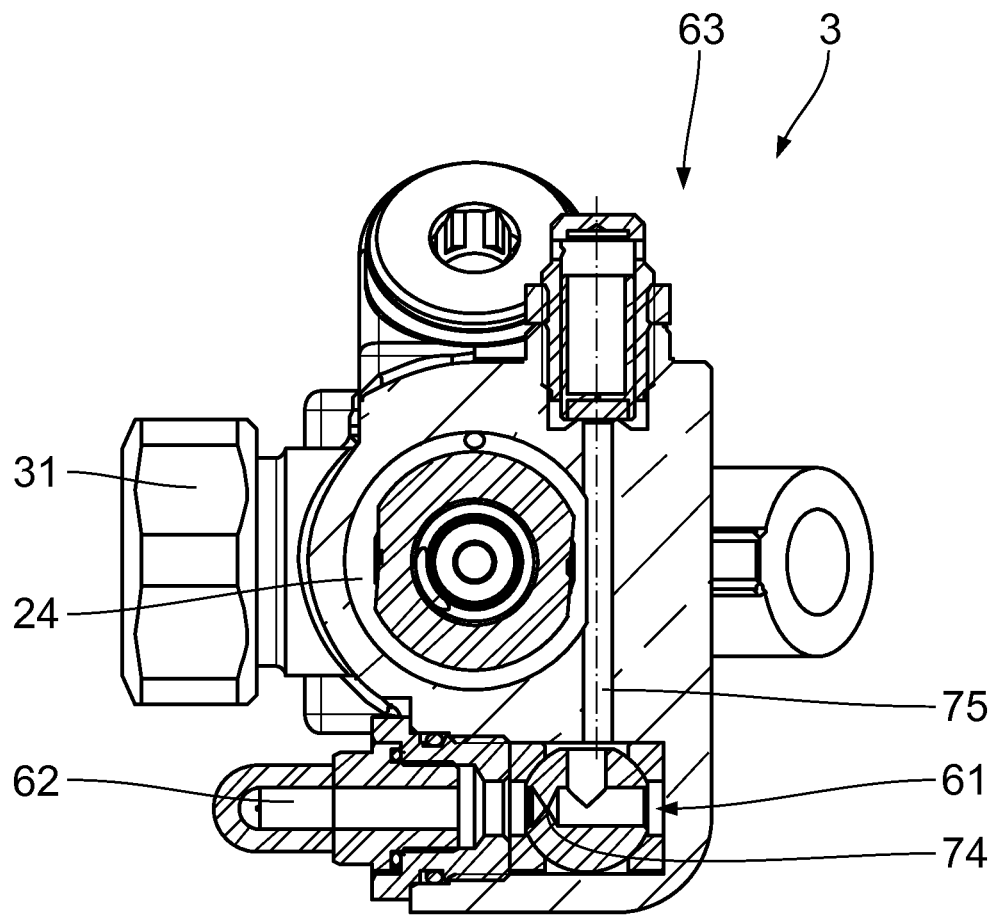
FIG. 14 is a cross sectional view of the valve according to FIG. 10 during the filling of the sensor line.

In the following the filling of the sensor line 5 is described in more detail with reference to FIGS. 13 and 14. For this the sensor line 5 is connected to the push-in screw 62 of the valve 3. As also shown in FIGS. 13 and 14 the valve output opening 30 was sealed by means of the valve cap 31 for the purpose of protection. For filling the sensor line 5 the throttle/stop valve 61 is moved by means of the pivot lever 64 from the stop position into a throttle position, which is shown in FIG. 14. The throttle position of the throttle/stop valve 61 is characterized in that a pressure connection of the low pressure chamber 24 inside the valve 3 is connected via a throttle/narrow point 74 in the throttle/stop valve 61 with the push-in screw 62 and thereby with the sensor line 5. The throttle narrow point 74 along a flow direction of the fire extinguishing medium has a cross section reduced by about 0.2 mm relative to the sensor line 5. It is particularly advantageous in this case that because of the throttling function of the throttle narrow point 74 in the throttle/stop valve 61 it is possible to fill the sensor line 5 slowly. This means, that during the filling of the sensor line 5 via the pressure control unit 21 the low pressure $p_N$ in the low pressure chamber 24 can be kept almost constant at the previously set level of 15 to 20 bar, so that the control piston 52 remains in the control piston closed position. In this way damage to the sensor line 5 and the triggering of the valve 3 during the filling of the sensor line 5 are avoided. A soon as the low pressure $p_N$ in the sensor line 5 is about 15 to 20 bar, the throttle/stop valve 61 is displaced by activating the pivot lever 64 from the throttle position into the open position, which is shown in FIG. 7. In the open position the low pressure chamber 24 is connected via a pressure connection to the push-in screw 62 and thereby with the sensor line 5, without there being a significant reduction in the cross section of the pressure connection along the fluid flow direction. In this position of the throttle/stop valve 61 the valve 3 is ready for operation.

In the following with reference to FIGS. 15 and 16 the triggering or activation of the valve 3 in the case of fire is described in more detail. In addition the valve cap 31 is removed from the valve output opening 30 of the valve 3 and the not shown extinguishing line 6 is connected to the valve output channel 29. In the case of fire the sensor line 5 bursts and the pressure in the sensor line 5 drops abruptly. An opening 76 of the sensor hose 5 after bursting is shown schematically in FIG. 16. In this way the valve 3 is activated, as described in the following. As the opening 76 of the sensor line 5 is many times greater after bursting than the cross section of the pressure equalization bore 32 of the closing piston 26, and like the connecting bore 70 of the pressure control piston 66 of the pressure control unit 21 the vessel pressure $p_B$ in the high pressure chamber 33 cannot be maintained and the low pressure $p_N$ in the low pressure chamber 24 can also not be maintained.

Since the pressure $p_N$ in the low pressure chamber 24 falls and in particular in the inner chamber 51 below the control piston 52, the control piston 52 is pushed owing to the control piston spring force of the control piston spring 60 acting thereon along the longitudinal axis 13 in the direction of the intermediate element 38 in the control piston open position. This arrangement is shown in FIGS. 15 and 16. In this way the high pressure chamber 33 is vented above the closing piston 26 via the longitudinal bore 42 and the transverse bore 43 of the pressure channel in the pressure channel column 45. The vessel pressure $p_B$ acts accordingly which acts on the valve input channel 17 and acts on the closing piston 26 along the longitudinal axis 13 away from the pressure vessel 2 such that the closing piston 26 is lifted from the valve seat 25. In this way the valve 3 is opened, so that fire extinguishing medium and/or pressure medium flows out of the pressure vessel 2 via the valve input channel 17, the valve seat 25 and through the valve output channel 29 into the extinguishing line 6 and thereby to the extinguishing nozzles 7 to the object to be protected.

Even during the triggered extinguishing process an insignificant amount of gas can flow continually out through the opening 76 in the sensor line 5 through the pressure equalization bore 32 of the closing piston 26 and through the connection bore 70 of the pressure control unit 21. However, the amount is so small that there is no build-up of pressure in the sensor line 5, which could lead to the closing of the valve 3. The system parameters for this can be determined depending on the maximum permissible length of the sensor line 5.

With the progression of the extinguishing process the vessel pressure $p_B$ in the pressure vessel 2 is reduced continually. If the vessel pressure $p_B$ is low enough, the closing piston spring 41 acting on the closing piston 26 causes the closing piston 26 to be moved downwards again in the direction of the valve seat 25. In this arrangement, i.e. after emptying the pressure vessel 2 the valve 3 is closed, but due to the lack of pressure in the high pressure chamber 33 the closing piston 26 with the valve seat seal 27 does not seal with the valve seat 25 in a gas-tight manner. However, this arrangement of the closing piston 26 is still sufficient to avoid the entry of dirt and/or moisture into the valve 3.

The position of the throttle/stop valve 61 is important for the functional safety of the fire extinguishing system 1 with the sensor line 5. This applies in particular to the use of the valve 3 for connecting the sensor line 5 to the pressure vessel 2. On the basis of the shown configuration of the valve 61 on the one hand it is possible to pressurize the sensor line 5 in the throttle position in a controlled manner with the low pressure $p_N$ and on the other hand to monitor the position monitoring of the valve 61 with the pivot lever signal generator 65. In this way it is possible to avoid the sensor line 5 being pressurized by an external pressure supply and after the installation of the fire extinguishing system 1 pressurized by a vessel pressure $p_B$. This can be performed for example by very slowly opening a corresponding valve, whereby on the basis of the complicated handling of such valves with corresponding locking mechanisms often a valve is activated and the fire extinguishing system is triggered unintentionally. By monitoring the position of the throttle/stop valve 61 with the pivot lever signal generator 65 the function-readiness of the valve 61 can be indicated. This means that for example a corresponding signal could be triggered at a fire central fire alarm system as soon as the valve 61 is not in the open position. Only in the open position is the valve 3 located in an operating state in which the triggering of the valve could trigger an extinguishing process. As long as the valve 61 is arranged in the stop position or throttle position an extinguishing process can be triggered by the valve 3.

Figure 15:
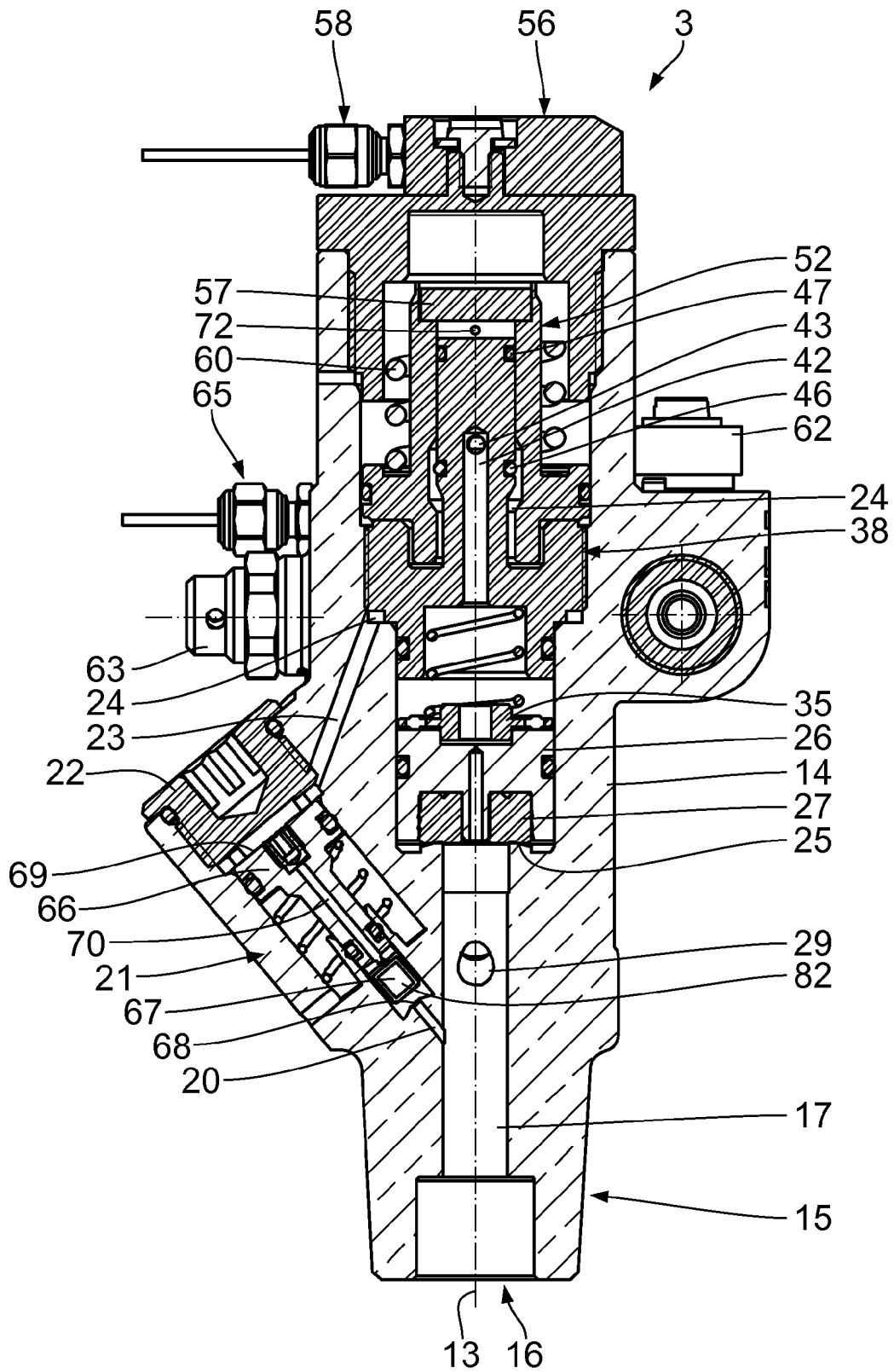
FIG. 15 is a longitudinal cross sectional view of the valve according to FIG. 11 during an extinguishing process.
Figure 16:
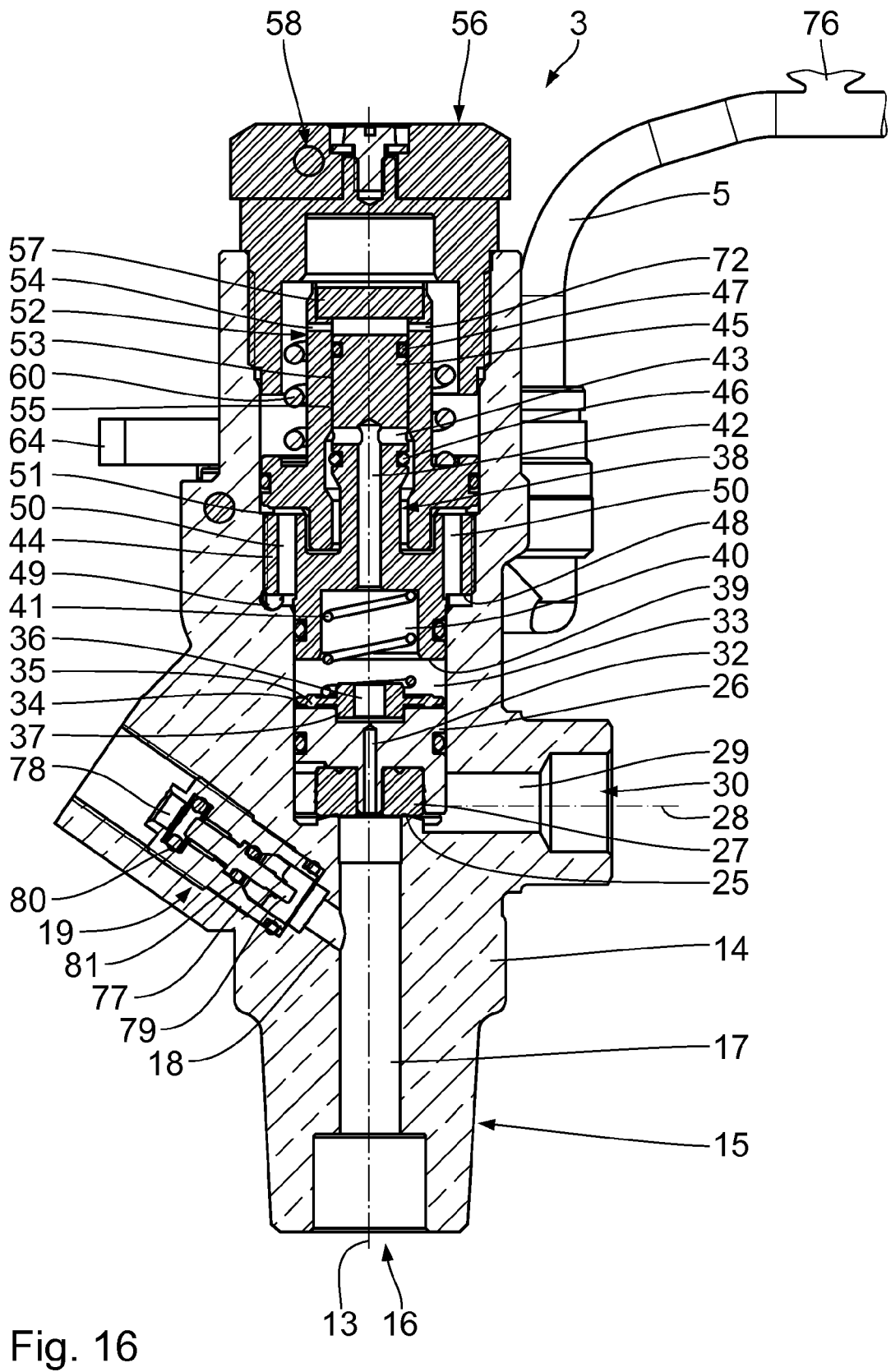
FIG. 16 is a longitudinal cross sectional view of the valve according to FIG. 13 during the extinguishing process.

Owing to the fact that the control piston 52 is moved on the basis of a drop in pressure in the inner chamber 51 into the control piston open position according to FIGS. 15 and 16, the distance of the permanent magnets 57 from the signal generator 58 arranged in the housing cover 56 is increased. In the control piston open position the control piston 52 is spaced apart from the signal generator 58 such that the distance of the permanent magnet 57 from the signal generator 58 is greater than the switching distance of the reed switch. Accordingly, a switching signal is triggered by the reed switch and via the control/regulating unit 59 sent to additional devices and units such as for example ventilators, in order to switch the latter off. In this way an extinguishing process is also supported and therefore accelerated. This result of the extinguishing process is thus improved. An essential advantage of the signal generator 58 is that the latter has no pressure connection to the low pressure chamber 24 and/or to the high pressure chamber 33 and thus is not source of leaks. Compared to known signal generators the signal generator 58 is unlikely to fail and does not cause any losses of fire extinguishing medium or pressure medium due to leaks.

While specific embodiments of the invention have been shown and described in detail to illustrate the application of the principles of the invention, it will be understood that the invention may be embodied otherwise without departing from such principles.

The invention claimed is:

1. A valve for a pressure vessel of an automatic fire extinguishing system, the valve comprising:

a valve housing with a valve output opening for connecting an extinguishing line, a valve input opening for connecting the valve to the pressure vessel, a valve seat arranged between the valve output opening and the valve input opening, a low pressure chamber for connecting a triggering device and a high pressure chamber which is connectable to the low pressure chamber;

a closing piston arranged in said valve housing, said closing piston comprising a valve seat seal which closing piston is movable between a closing piston closed position and a closing piston open position;

a pressure control unit arranged in said valve housing, said pressure control unit being in pressure connection with the valve input opening and the low pressure chamber for controlling a low pressure in the low pressure chamber relative to a vessel pressure of the pressure vessel; and a control piston arranged in said valve housing, said control piston being movable between a control piston closed position and a control piston open position, wherein the closing piston in the closing piston closed position is arranged with the valve seat seal on the valve seat in a fluid-tight manner, so that the valve output opening is sealed relative to the valve input opening, wherein the closing piston is arranged in the closing piston open position spaced apart from the valve seat, so that the valve output opening and the valve input opening are in pressure connection, wherein the control piston in the control piston closed position seals a pressure channel between the high pressure chamber and the low pressure chamber in a fluid-tight manner, and wherein the control piston in the control piston open position releases the pressure channel, so that the high pressure chamber and the low pressure chamber are in pressure connection.

2. A valve according to claim 1, further comprising:
a throttle/stop valve arranged between the low pressure chamber and a triggering opening for connecting the triggering device for regulating a pressure connection between the low pressure chamber and the triggering device.

3. A valve according to claim 2, wherein the throttle/stop valve is arrangeable by means of a pivot lever between a stop position, a throttle position and an open position.

4. A valve according to claim 2, further comprising:
a pivot lever signal generator for detecting a position of the throttle/stop valve.

5. A valve according to claim 1, further comprising:
a pressure equalization bore in the closing piston for a pressure connection of the valve input opening with the high pressure chamber.

6. A valve according to claim 1, wherein the low pressure in the low pressure chamber is reduced compared to the vessel pressure in the pressure vessel via said pressure control unit.

7. A valve according to claim 1, further comprising:
a connection for a connection element.

8. A valve according to claim 1, further comprising:
a signal generator for identifying the position of the control piston in the valve housing to trigger an extinguishing process.

9. A valve according to claim 1, wherein the pressure channel, runs through an intermediate element, whereby the pressure channel is closable in a fluid-tight manner by the control piston.

10. A valve according to claim 8, further comprising:
a control piston spring such that a spring force acts on the control piston in a direction of the intermediate element to open the pressure channel.

11. A valve according to claim 1, further comprising:
a damping element for damping impact on the closing piston moved away from the valve seat.

12. A valve according to claim 1, further comprising:
a closing piston spring such that a spring force acts on the closing piston in a direction of the valve seat.

13. A valve according to claim 11, wherein a closing piston spring is arranged between an intermediate element and the damping element.

14. A valve according to claim 1, further comprising:
a connection for a pressure measuring device.

* * * * *